(12) United States Patent
Hirota

(10) Patent No.: US 8,813,480 B2
(45) Date of Patent: Aug. 26, 2014

(54) EXHAUST PURIFICATION SYSTEM OF INTERNAL COMBUSTION ENGINE

(75) Inventor: Shinya Hirota, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 234 days.

(21) Appl. No.: 13/375,384

(22) PCT Filed: Jun. 3, 2009

(86) PCT No.: PCT/JP2009/060565
§ 371 (c)(1),
(2), (4) Date: Jan. 3, 2012

(87) PCT Pub. No.: WO2010/140262
PCT Pub. Date: Dec. 9, 2010

(65) Prior Publication Data
US 2012/0102927 A1 May 3, 2012

(51) Int. Cl.
*F01N 3/00* (2006.01)
*F01N 3/02* (2006.01)
*F01N 3/20* (2006.01)

(52) U.S. Cl.
USPC ............ 60/295; 60/286; 60/299; 60/301

(58) Field of Classification Search
USPC .................. 60/286, 295, 299, 301
See application file for complete search history.

(56) References Cited

U.S. PATENT DOCUMENTS

| 6,863,874 | B1* | 3/2005 | Twigg | 423/210 |
|---|---|---|---|---|
| 7,063,642 | B1* | 6/2006 | Hu et al. | 477/100 |
| 7,210,288 | B2* | 5/2007 | Bandl-Konrad et al. | 60/297 |
| 8,166,751 | B2* | 5/2012 | Robel | 60/297 |
| 8,209,960 | B2* | 7/2012 | Shamis et al. | 60/286 |
| 2010/0089038 | A1 | 4/2010 | Tsujimoto et al. | |
| 2010/0115926 | A1* | 5/2010 | Nagaoka et al. | 60/286 |
| 2010/0132635 | A1* | 6/2010 | McCarthy et al. | 123/3 |
| 2010/0290957 | A1* | 11/2010 | Yoshida et al. | 422/109 |

FOREIGN PATENT DOCUMENTS

| EP | 1 186 764 A2 | 3/2002 |
|---|---|---|
| JP | A-08-014027 | 1/1996 |
| JP | A 11-350939 | 12/1999 |
| JP | A-2000-265828 | 9/2000 |
| JP | A-2002-155736 | 5/2002 |

(Continued)

OTHER PUBLICATIONS

International Search Report in International Application No. PCT/JP2009/060565; dated Sep. 8, 2009 (with English-language translation).

*Primary Examiner* — Thomas Denion
*Assistant Examiner* — Dapinder Singh
(74) *Attorney, Agent, or Firm* — Oliff PLC

(57) ABSTRACT

An exhaust purification system of an internal combustion engine is provided with a first $NO_X$ selective reduction catalyst which is arranged inside of an engine exhaust passage and which selectively reduces $NO_X$ by feed of a reducing agent, a second $NO_X$ selective reduction catalyst which is arranged inside of the engine exhaust passage at the downstream side of the first $NO_X$ selective reduction catalyst and which selectively reduces $NO_X$ by feed of a reducing agent, and a reducing agent feed device which feeds a reducing agent to the first $NO_X$ selective reduction catalyst. The system estimates the amount of adsorption of the reducing agent which is adsorbed at the second $NO_X$ selective reduction catalyst and prevents the estimated amount of adsorption of the reducing agent from exceeding the allowable value by adjusting the amount of feed of reducing agent from the reducing agent feed device.

13 Claims, 8 Drawing Sheets

(56) References Cited

FOREIGN PATENT DOCUMENTS

| JP | A-2003-293740 | 10/2003 |
| JP | A-2003-529699 | 10/2003 |
| JP | A-2005-351160 | 12/2005 |
| JP | A-2008-215123 | 9/2008 |
| JP | A-2008-286102 | 11/2008 |
| WO | WO 00/29728 A1 | 5/2000 |
| WO | WO 2008/105549 * | 9/2008 |

* cited by examiner

Fig.1
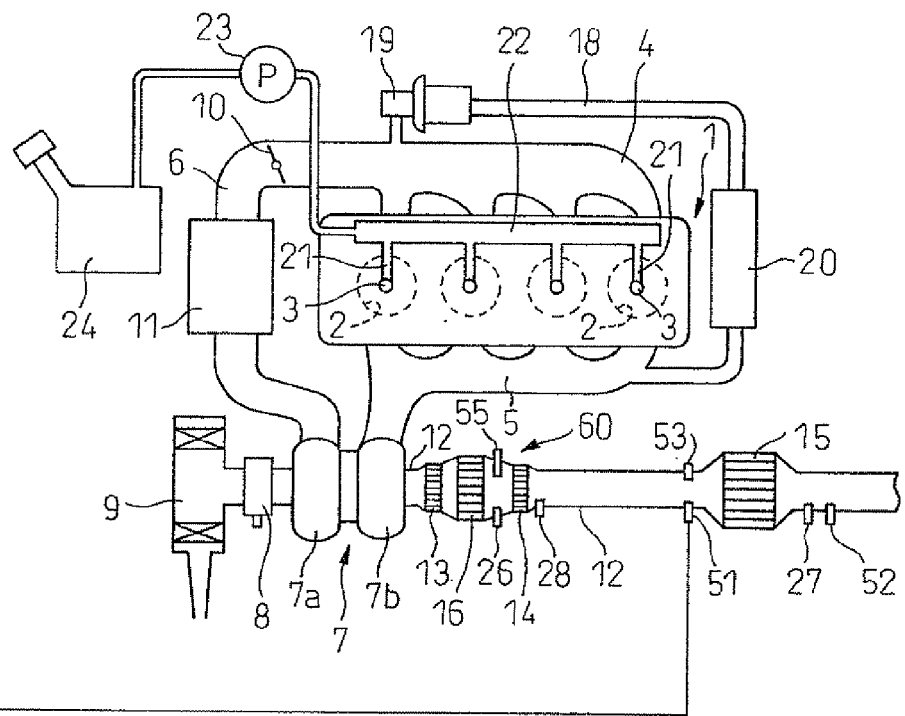
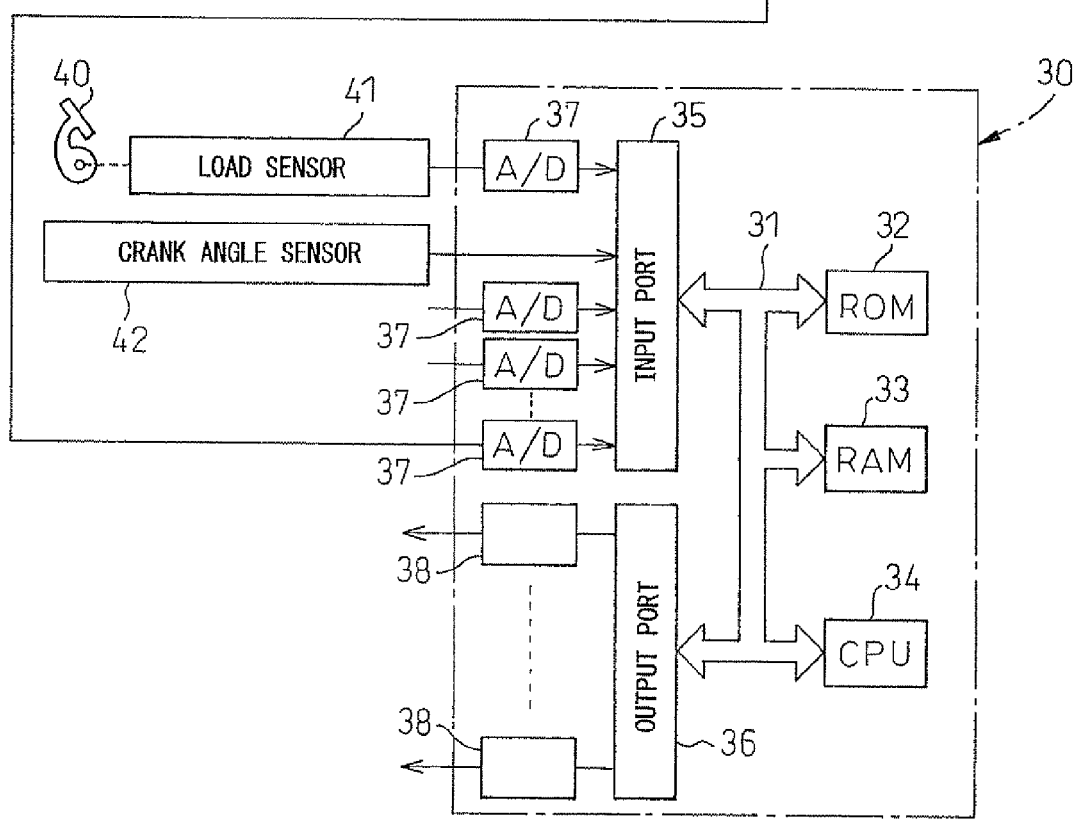

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust gas of diesel engines, gasoline engines, and other internal combustion engines includes, for example, carbon monoxide (CO), unburned fuel (HC), nitrogen oxides ($NO_X$), particulate matter (PM), and other constituents. The internal combustion engines are mounted with exhaust purification systems for removing these ingredients.

The $NO_X$ which is contained in the exhaust gas is purified by reduction. To purify the $NO_X$ which is contained in the exhaust gas, sometimes an $NO_X$ selective reduction catalyst which can selectively reduce $NO_X$ is arranged in the engine exhaust passage. The $NO_X$ selective reduction catalyst can reduce the $NO_X$ which is exhausted from the engine body by feeding a reducing agent in a predetermined temperature region.

Japanese Patent Publication (A) No. 2003-529699 discloses a system which includes a first catalyst which is arranged downstream of the engine body and a second catalyst which is arranged downstream of the first catalyst wherein the first catalyst reduces the $NO_X$ when in a first temperature range and the second catalyst reduces the $NO_X$ when in a second temperature range. This publication discloses introducing a reducing agent to the catalyst where the temperature of exhaust gas is within the temperature range of catalyst activity among the two catalysts arranged in series.

CITATION LIST

Patent Literature

PLT 1: Japanese Patent Publication (A) No. 2003-529699

SUMMARY OF INVENTION

Technical Problem

In an $NO_X$ selective reduction catalyst, when using ammonia as a reducing agent, an aqueous urea solution is fed inside of the upstream side engine exhaust passage of the $NO_X$ selective reduction catalyst. The aqueous urea solution is fed so as to give an equivalent ratio of 1 with respect to the amount of $NO_X$ which flows into the $NO_X$ selective reduction catalyst. In this regard, the fed aqueous urea solution has uneven concentration, so locally the equivalent ratio will exceed 1. In particular, when feeding an aqueous urea solution intermittently from an aqueous urea solution feed valve, large amounts of aqueous urea solution are fed at predetermined intervals, so parts can be formed where the equivalent ratio exceeds 1. For this reason, sometimes ammonia slips through the $NO_X$ selective reduction catalyst, that is, so-called "ammonia slip" occurs.

Further, ammonia is adsorbed at the $NO_X$ selective reduction catalyst. The amount of ammonia adsorption becomes smaller along with the rise of temperature of the $NO_X$ selective reduction catalyst. If the temperature of the $NO_X$ selective reduction catalyst becomes higher, the ratio of the ammonia which slips through the $NO_X$ selective reduction catalyst becomes higher. That is, if the temperature becomes higher, ammonia slip easily occurs.

If the reducing agent slips through the $NO_X$ selective reduction catalyst, it is discharged into the atmosphere. For example, if the ammonia used as a reducing agent is discharged into the atmosphere, the problem of odor etc. occurs. Therefore, the reducing agent preferably is completely consumed in the exhaust purification system and not discharged into the atmosphere.

The above Japanese Patent Publication (A) No. 2003-529699 discloses arranging an oxidation catalyst downstream of the second $NO_X$ selective reduction catalyst and oxidizing the ammonia which flows out from the second $NO_X$ selective reduction catalyst for removal. However, in this system, it is necessary to newly arrange an oxidation catalyst for removing ammonia.

Solution to Problem

The present invention has as its object the provision of an exhaust purification system of an internal combustion engine which is provided with an $NO_X$ selective reduction catalyst which selectively reduces the $NO_X$ and which suppresses outflow of the reducing agent from the $NO_X$ selective reduction catalyst.

A first exhaust purification system of an internal combustion engine of the present invention is provided with a first $NO_X$ selective reduction catalyst which is arranged inside of an engine exhaust passage and which selectively reduces $NO_X$ by feed of a reducing agent, a second $NO_X$ selective reduction catalyst which is arranged inside of the engine exhaust passage at the downstream side of the first $NO_X$ selective reduction catalyst and which selectively reduces $NO_X$ by feed of a reducing agent, and a reducing agent feed device which feeds a reducing agent to the first $NO_X$ selective reduction catalyst. The system estimates the amount of adsorption of the reducing agent which is adsorbed at the second $NO_X$ selective reduction catalyst and prevents the estimated amount of adsorption of the reducing agent from exceeding the allowable value by adjusting the amount of feed of reducing agent from the reducing agent feed device.

In the above invention, when the amount of adsorption of the reducing agent of the second $NO_X$ selective reduction catalyst becomes a predetermined judgment value of less than the allowable value or more, it is possible to decrease the amount of feed of reducing agent from the reducing agent feed device.

In the above invention, the first $NO_X$ selective reduction catalyst preferably has a heat resistance temperature which is higher than the heat resistance temperature of the second $NO_X$ selective reduction catalyst.

A second exhaust purification system of an internal combustion engine of the present invention is provided with a first $NO_X$ selective reduction catalyst which is arranged inside of an engine exhaust passage and which selectively reduces $NO_X$ by feed of a reducing agent, a second $NO_X$ selective reduction catalyst which is arranged inside of the engine exhaust passage at the downstream side of the first $NO_X$ selective reduction catalyst and which selectively reduces $NO_X$ by feed of a reducing agent, and a reducing agent feed device which feeds a reducing agent to the first $NO_X$ selective reduction catalyst. The system estimates the amount of adsorption of the reducing agent which is adsorbed at the second $NO_X$ selective reduction catalyst and makes the amount of $NO_X$ which is exhausted from the engine body increase when the amount of adsorption of the reducing agent of the second $NO_X$ selective reduction catalyst becomes a predetermined judgment value or more.

In the above invention, the first $NO_X$ selective reduction catalyst preferably has a heat resistance temperature which is higher than the heat resistance temperature of the second $NO_X$ selective reduction catalyst.

A third exhaust purification system of an internal combustion engine of the present invention is provided with a first $NO_X$ selective reduction catalyst which is arranged inside of an engine exhaust passage and which selectively reduces $NO_X$ by feed of a reducing agent, a second $NO_X$ selective reduction catalyst which is arranged inside of the engine exhaust passage at the downstream side of the first $NO_X$ selective reduction catalyst and which selectively reduces $NO_X$ by feed of a reducing agent, and a reducing agent feed device which feeds a reducing agent to the first $NO_X$ selective reduction catalyst. The system estimates the concentration of the reducing agent which flows out from the second $NO_X$ selective reduction catalyst and prevents the concentration of the estimated reducing agent from exceeding the allowable value by adjusting the amount of feed of reducing agent from the reducing agent feed device.

In the above invention, it is possible to decrease the amount of feed of reducing agent from the reducing agent feed device when the concentration of the reducing agent which flows out from the second $NO_X$ selective reduction catalyst becomes a predetermined judgment value of less than the allowable value or more.

In the above invention, the first $NO_X$ selective reduction catalyst preferably has a heat resistance temperature which is higher than the heat resistance temperature of the second $NO_X$ selective reduction catalyst.

A fourth exhaust purification system of an internal combustion engine of the present invention is provided with a first $NO_X$ selective reduction catalyst which is arranged inside of an engine exhaust passage and which selectively reduces $NO_X$ by feed of a reducing agent, a second $NO_X$ selective reduction catalyst which is arranged inside of the engine exhaust passage at the downstream side of the first $NO_X$ selective reduction catalyst and which selectively reduces $NO_X$ by feed of a reducing agent, and a reducing agent feed device which feeds a reducing agent to the first $NO_X$ selective reduction catalyst. The system estimates the concentration of the reducing agent which flows out from the second $NO_X$ selective reduction catalyst and makes the amount of $NO_X$ which is exhausted from the engine body increase when the concentration of the reducing agent which flows out from the second $NO_X$ selective reduction catalyst becomes a predetermined judgment value or more.

In the above invention, the first $NO_X$ selective reduction catalyst preferably has a heat resistance temperature which is higher than the heat resistance temperature of the second $NO_X$ selective reduction catalyst.

Advantageous Effects of Invention

It is possible to provide an exhaust purification system of an internal combustion engine which is provided with an $NO_X$ selective reduction catalyst which selectively reduces $NO_X$ and which suppresses outflow of the reducing agent from the $NO_X$ selective reduction catalyst.

BRIEF DESCRIPTION OF DRAWINGS

FIG. 1 is a schematic view of an internal combustion engine in a first embodiment.

DESCRIPTION OF EMBODIMENTS

First Embodiment

Figure 2:
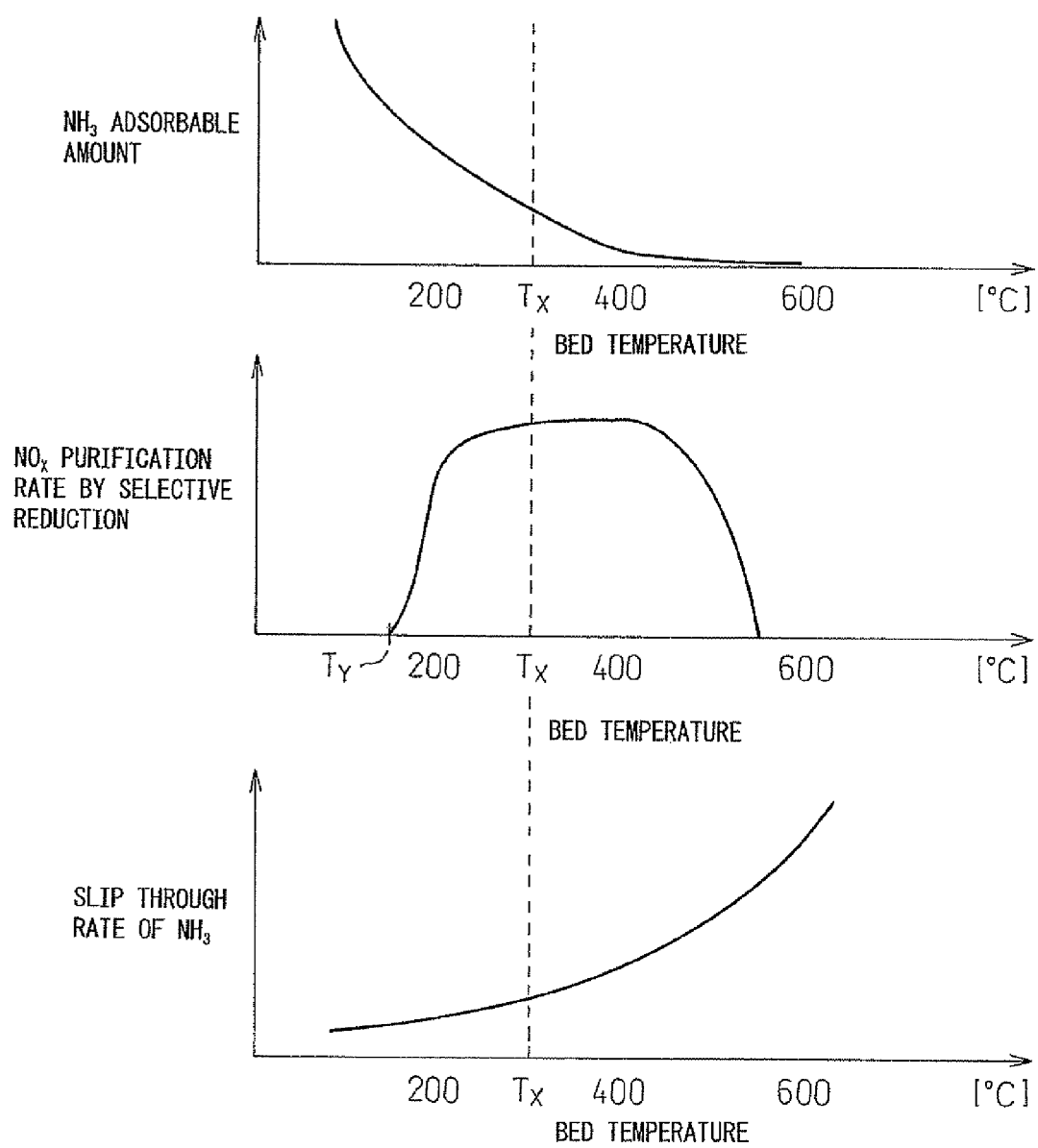
FIG. 2 shows graphs showing the characteristics of an $NO_X$ selective reduction catalyst in the first embodiment.

Referring to FIG. 1 to FIG. 6, an exhaust purification system of an internal combustion engine in a first embodiment will be explained.

FIG. 1 shows a schematic view of an internal combustion engine in the present embodiment. In the present embodiment, the explanation will be given with reference to the example of a compression ignition type diesel engine which is mounted in an automobile. The internal combustion engine is provided with an engine body 1. Further, the internal combustion engine is provided with an exhaust purification system. The engine body 1 includes cylinders comprised of combustion chambers 2, electronic control type fuel injectors 3 for injecting fuel to the respective combustion chambers 2, an intake manifold 4, and an exhaust manifold 5.

The intake manifold 4 is connected through an intake duct 6 to an outlet of a compressor 7a of an exhaust turbocharger 7. The inlet of the compressor 7a is connected through an intake air detector 8 to an air cleaner 9. Inside of the intake duct 6, a throttle valve 10 which is driven by a step motor is arranged. Furthermore, in the middle of the intake duct 6, a cooling device 11 is arranged for cooling the intake air which flows through the inside of the intake duct 6. In the embodiment which is shown in FIG. 1, engine cooling water is guided to the cooling device 11. The engine cooling water is used to cool the intake air.

On the other hand, the exhaust manifold 5 is connected to an inlet of a turbine 7b of an exhaust turbocharger 7. The exhaust purification system in the present embodiment includes a manifold converter 60 as an exhaust processing device which is arranged near the exhaust manifold 5. The manifold converter 60 includes an oxidation catalyst 13, particulate filter 16, and $NO_X$ selective reduction catalyst (SCR) 14. The manifold converter 60 is connected to the outlet of the turbine 7b through an exhaust pipe 12.

In the present embodiment, the exhaust pipe 12 which is connected to the outlet of the turbine 7b is connected to the oxidation catalyst 13 of the manifold converter 60. Downstream of the oxidation catalyst 13, a particulate filter 16 is arranged. Downstream of the particulate filter 16, a first $NO_X$ selective reduction catalyst comprised of the $NO_X$ selective reduction catalyst 14 is arranged. These catalysts and the filter are arranged in proximity with each other.

Downstream of the manifold converter 60, a second $NO_X$ selective reduction catalyst comprised of an $NO_X$ selective reduction catalyst 15 is connected through the exhaust pipe 12. The exhaust purification system of the internal combustion engine in the present embodiment has a plurality of $NO_X$ selective reduction catalysts arranged in series.

The exhaust purification system of an internal combustion engine is provided with a reducing agent feed device which feeds a reducing agent to the $NO_X$ selective reduction catalyst 14. In the present embodiment, ammonia is used as the reducing agent. The reducing agent feed device includes an aqueous urea solution feed valve 55. The aqueous urea solution feed valve 55 is arranged in the engine exhaust passage at an upstream side of the $NO_X$ selective reduction catalyst 14. The aqueous urea solution feed valve 55 is formed so as to inject the aqueous urea solution into the engine exhaust passage. The aqueous urea solution feed valve 55 is arranged between the particulate filter 16 and the $NO_X$ selective reduction catalyst 14 so as to inject the aqueous urea solution. The reducing agent feed device in the present embodiment is formed so as to feed the aqueous urea solution, but the invention is not limited to this. It may also be formed so as to feed an aqueous ammonia solution.

Between the exhaust manifold 5 and the intake manifold 4, an EGR passage 18 is arranged for performing exhaust gas recirculation (EGR). Inside the EGR passage 18, an electronic control type EGR control valve 19 is arranged. Further, in the middle of the EGR passage 18, a cooling device 20 is arranged so as to cool the EGR gas which flows through the inside of the EGR passage 18. In the embodiment which is shown in FIG. 1, the engine cooling water is guided to the inside of the cooling device 20. The engine cooling water is used to cool the EGR gas.

Each fuel injector 3 is connected through a fuel feed pipe 21 to a common rail 22. The common rail 22 is connected through an electronic control type variable discharge fuel pump 23 to a fuel tank 24. The fuel which is stored in the fuel tank 24 is fed by the fuel pump 23 to the inside of the common rail 22. The fuel which is fed to the inside of the common rail 22 is fed through each fuel feed pipe 21 to each fuel injector 3.

The electronic control unit 30 is comprised of a digital computer. The electronic control unit 30 in the present embodiment functions as a control device of the exhaust purification system. The electronic control unit 30 includes components which are connected to each other by a bidirectional bus 31 such as a ROM (read only memory) 32, RAM (random access memory) 33, CPU (microprocessor) 34, input port 35, and output port 36.

Downstream of the particulate filter 16, a temperature sensor 26 is arranged for detecting the temperature of the particulate filter 16. Downstream of the $NO_X$ selective reduction catalyst 14, a temperature sensor 28 is arranged for detecting the temperature of the $NO_X$ selective reduction catalyst 14. Downstream of the $NO_X$ selective reduction catalyst 15, a temperature sensor 27 is arranged for detecting the temperature of the $NO_X$ selective reduction catalyst 15. Upstream of the $NO_X$ selective reduction catalyst 15, an $NO_X$ sensor 51 is arranged for detecting the amount of $NO_X$ which flows into the $NO_X$ selective reduction catalyst 15. Downstream of the $NO_X$ selective reduction catalyst 15, an $NO_X$ sensor 52 is arranged for detecting the amount of $NO_X$ which flows out from the $NO_X$ selective reduction catalyst 15. Further, upstream of the $NO_X$ selective reduction catalyst 15, an ammonia sensor 53 is arranged for detecting the amount of ammonia which flows into the $NO_X$ selective reduction catalyst 15. The output signals of these temperature sensors 26, 27, and 28, $NO_X$ sensors 51 and 52, and ammonia sensor 53 are input through corresponding AD converters 37 to the input port 35.

Further, the output signal of the intake air detector 8 is input through a corresponding AD converter 37 to the input port 35. An accelerator pedal 40 is connected to a load sensor 41 which generates an output voltage which is proportional to the amount of depression of the accelerator pedal 40. The output voltage of the load sensor 41 is input to the input port 35 through the corresponding AD converter 37. Furthermore, the input port 35 is connected to a crank angle sensor 42 which generates an output pulse every time the crankshaft rotates by for example 15°. The output of the crank angle sensor 42 can be used to detect the speed of the engine body.

On the other hand, the output port 36 is connected through a corresponding drive circuit 38 to the fuel injectors 3, step motor for driving the throttle valve 10, EGR control valve 19, and fuel pump 23. Furthermore, the output port 36 is connected through a corresponding drive circuit 38 to the aqueous urea solution feed valve 55. The aqueous urea solution feed valve 55 in the present embodiment is controlled by the electronic control unit 30

The oxidation catalyst 13 is a catalyst which has an oxidation ability. The oxidation catalyst 13 is, for example, provided with a substrate which has partition walls which extend in the direction of flow of the exhaust gas. The substrate is formed in for example a honeycomb structure. The substrate is, for example, housed in a cylindrically-shaped case. At the surface of the substrate, for example, a porous oxide powder is used to form a catalyst carrier comprised of a coated layer. The coated layer carries a catalyst metal which is formed by platinum (Pt), rhodium (Rd), palladium (Pd), or other such precious metal. The carbon monoxide or unburned hydrocarbons which are contained in the exhaust gas is oxidized at the oxidation catalyst and converted to water or carbon dioxide etc.

The particulate filter 16 is a filter which removes carbon particles which are contained in exhaust gas and particulate matter which is comprised of the high boiling point ingredients of fuel and engine oil ingredients. The particulate filter, for example, has a honeycomb structure and has a plurality of channels which extend in a direction of flow of the gas. In the plurality of channels, channels with downstream ends which are sealed and channels with upstream ends which are sealed are alternately formed. The partition walls of the channels are formed by a porous material such as cordierite. The particulate matter is trapped when the exhaust gas passes through the partition walls.

The particulate matter is trapped on the particulate filter 16 and oxidized. The particulate matter which gradually deposits on the particulate filter 16 is removed by oxidation by raising the temperature in an air-excess atmosphere until for example 600° C. or so.

The $NO_X$ selective reduction catalysts 14 and 15 in the present embodiment are catalysts which use ammonia as a reducing agent and selectively reduce $NO_X$. The $NO_X$ selective reduction catalyst using ammonia as a reducing agent, for example, can use a catalyst comprised of zeolite on which iron or copper or another transition metal is carried by ion exchange. Alternatively, the $NO_X$ selective reduction catalyst can use a catalyst carrier on which a catalyst metal of a precious metal is carried. As the catalyst metal of the precious metal, platinum (Pt) or rhodium (Rh) or other precious metal can be used. As the catalyst carrier, for example, titania ($TiO_2$) or alumina ($Al_2O_3$) or other substance can be used. Alternatively, the $NO_X$ selective reduction catalyst used can be made a catalyst which uses titania etc. as a carrier and carries vanadium oxide on this carrier.

The $NO_X$ selective reduction catalysts 14 and 15 in the present embodiment used are catalysts comprised of zeolite on which a transition metal is carried by ion exchange.

If an aqueous urea solution is fed from the aqueous urea solution feed valve into the exhaust gas which flows in the engine exhaust passage, the aqueous urea solution is hydrolyzed. Due to the aqueous urea solution being hydrolyzed, ammonia and carbon dioxide are generated. The generated ammonia is fed to the $NO_X$ selective reduction catalyst, whereupon in the $NO_X$ selective reduction catalysts, the $NO_X$ which is contained in the exhaust gas is reduced to nitrogen. Next, the characteristics of the $NO_X$ selective reduction catalysts in the present embodiment will be explained in detail.

FIG. 2 shows graphs which show the adsorbable amount of ammonia, $NO_X$ purification rate, and slip through rate of ammonia of an $NO_X$ selective reduction catalyst in the present embodiment. In these graphs, the abscissa indicates the bed temperature of an $NO_X$ selective reduction catalyst. An $NO_X$ selective reduction catalyst can reduce $NO_X$ at a predetermined temperature $T_y$ or more. Further, an $NO_X$ selective reduction catalyst has an activation temperature $T_X$ as a temperature showing the significant purification rate by selective reduction.

On the other hand, ammonia or another reducing agent is adsorbed at the catalyst carrier etc. if flowing into an $NO_X$ selective reduction catalyst. In particular, zeolite, which has a large number of pores on the surface, easily adsorbs ammonia. Furthermore, zeolite which has acidity adsorbs a large amount of the alkaline ammonia. In this way, the $NO_X$ selective reduction catalyst in the present embodiment can adsorb a large amount of ammonia. The maximum amount of ammonia which can be adsorbed, that is, the absorbable amount of ammonia, becomes higher the lower the temperature.

The graph of the $NO_X$ purification rate by selective reduction shows the purification rate in the case when feeding an aqueous urea solution from the aqueous urea solution feed valve to give an equivalent ratio of 1 with respect to the $NO_X$ which flows into the $NO_X$ selective reduction catalyst. When the $NO_X$ selective reduction catalyst is the activation temperature $T_X$ or more, it is possible to reduce a large amount of $NO_X$, so a high $NO_X$ purification rate is exhibited. However, if the temperature rises, the amount of ammonia adsorption decreases. Furthermore, when the $NO_X$ selective reduction catalyst becomes a predetermined temperature or more, the ammonia self oxidizes, so the catalyst activity gradually falls. For this reason, the $NO_X$ purification rate gradually falls.

When an $NO_X$ selective reduction catalyst has a temperature lower than the activation temperature $T_X$, the activity of the catalyst metal is low. In this regard, even if the catalyst is not sufficiently activated, the amount of ammonia adsorption is large, so there is a high $NO_X$ purification rate. In this way, an $NO_X$ selective reduction catalyst can purify $NO_X$ in a predetermined temperature region.

Referring to FIG. 1, in the present embodiment, when the temperature of the upstream side $NO_X$ selective reduction catalyst 14 and the temperature of the downstream side $NO_X$ selective reduction catalyst 15 are the same as each other, the downstream side $NO_X$ selective reduction catalyst 15 is formed so that the adsorbable amount of ammonia becomes larger than the upstream side $NO_X$ selective reduction catalyst 14. For example, the downstream side $NO_X$ selective reduction catalyst is formed larger than the upstream side $NO_X$ selective reduction catalyst so that the surface area of the catalyst carrier where the ammonia is adsorbed becomes larger.

In the present embodiment, an aqueous urea solution is fed from the aqueous urea solution feed valve 55 to the engine exhaust passage during operation of the engine body 1. The ammonia which was generated from the aqueous urea solution flows into the upstream side $NO_X$ selective reduction catalyst 14. At the $NO_X$ selective reduction catalyst 14, the ammonia is consumed by reduction of $NO_X$. The ammonia which was not used for reduction of $NO_X$ is adsorbed at the $NO_X$ selective reduction catalyst 14 or flows out from the $NO_X$ selective reduction catalyst 14. Further, sometimes the ammonia which was adsorbed at the $NO_X$ selective reduction catalyst 14 desorbs and flows out. The ammonia which flows out from the $NO_X$ selective reduction catalyst 14 flows into the downstream side $NO_X$ selective reduction catalyst 15. The $NO_X$ selective reduction catalyst 15 adsorbs ammonia or reduces $NO_X$.

The exhaust purification system of the internal combustion engine in the present embodiment is formed so as to be able to estimate the amount of ammonia adsorption of the downstream side $NO_X$ selective reduction catalyst 15. The "estimate" in the present invention includes direct detection using a sensor etc. and calculation using the output of a sensor or map.

In the present embodiment, the $NO_X$ sensor 51 which is arranged at the upstream side of the $NO_X$ selective reduction catalyst 15 is used to detect the amount of $NO_X$ which flows into the $NO_X$ selective reduction catalyst 15. The $NO_X$ sensor 52 which is arranged at the downstream side of the $NO_X$ selective reduction catalyst 15 is used to detect the amount of $NO_X$ which flows out from the $NO_X$ selective reduction catalyst 15. By subtracting the amount of $NO_X$ which flows out from the $NO_X$ selective reduction catalyst 15 in a predetermined period from the amount of $NO_X$ which flows into the $NO_X$ selective reduction catalyst 15 in a predetermined period, it is possible to calculate the amount of $NO_X$ which is reduced at the $NO_X$ selective reduction catalyst 15. The reduced amount of $NO_X$ may be used to calculate the amount of ammonia which is consumed in the $NO_X$ selective reduction catalyst 15.

On the other hand, the output of the ammonia sensor 53 which is arranged at the upstream side of the $NO_X$ selective reduction catalyst 15 can be used to detect the amount of ammonia which flows into the $NO_X$ selective reduction catalyst 15. By subtracting the amount of ammonia which is consumed at the $NO_X$ selective reduction catalyst 15 from the amount of ammonia which flows into the $NO_X$ selective reduction catalyst 15, it is possible to calculate the change in the amount of ammonia adsorption of the $NO_X$ selective reduction catalyst 15. By repeating this calculation for every predetermined interval, it is possible to estimate the amount of ammonia adsorption at any time.

The device for estimating the amount of ammonia which is adsorbed at the $NO_X$ selective reduction catalyst 15 is not limited to this. Any device may be used. For example, the amount of injection of fuel in a combustion chamber, the engine speed, the amount of feed of the aqueous urea solution from the aqueous urea solution feed valve, the temperature of the exhaust gas, etc. may be used as the basis to calculate the amount of ammonia adsorption of the downstream side $NO_X$ selective reduction catalyst 15 using a map etc.

Figure 3:
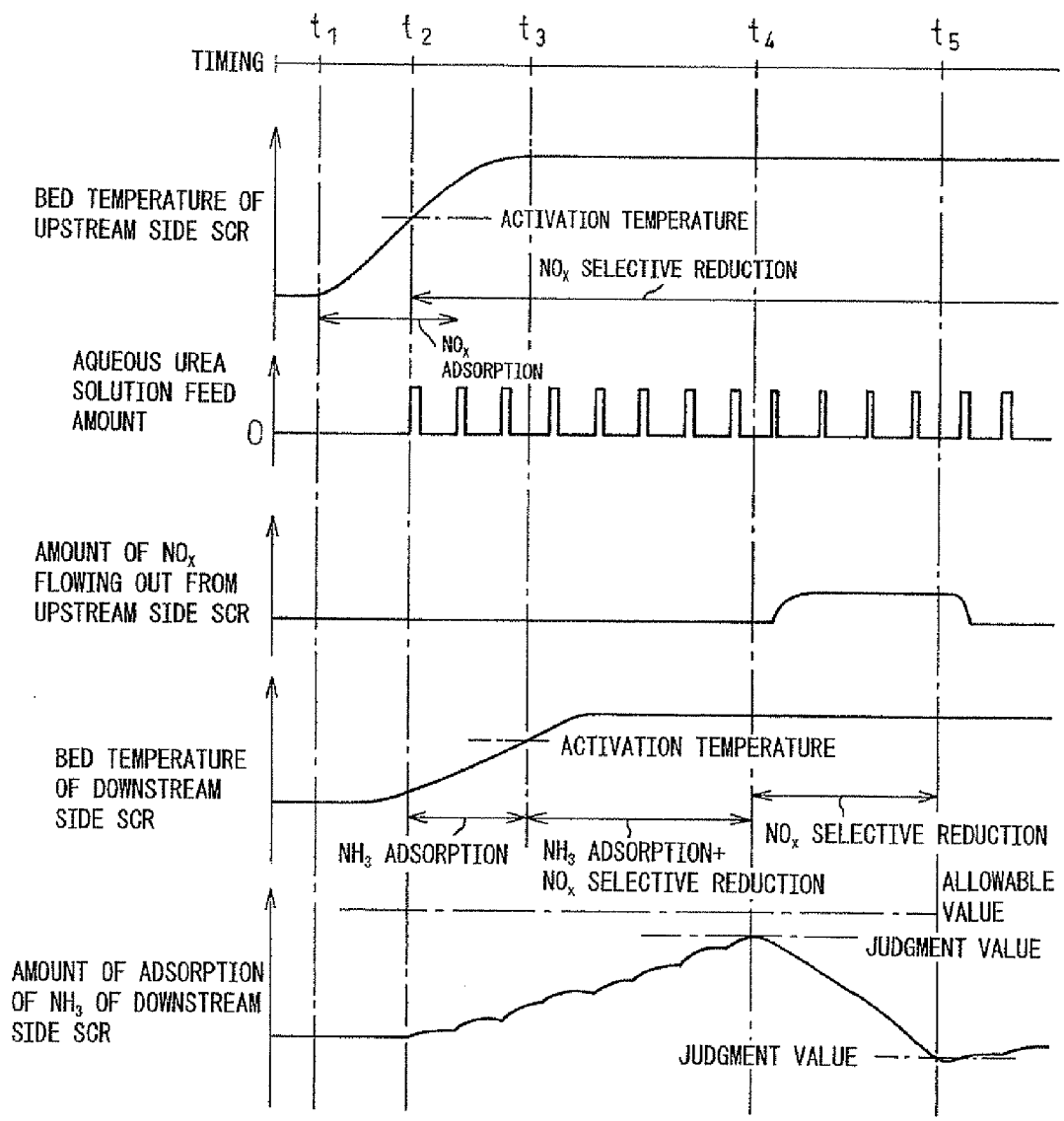
FIG. 3 is a time chart for explaining operational control in the first embodiment.

FIG. 3 is a time chart of operational control of the internal combustion engine in the present embodiment. In the present embodiment, the internal combustion engine is started up cold. The internal combustion engine is started up from the state where the engine body and exhaust purification system of the internal combustion engine are at the temperature of the outside air.

At the timing $t_1$, the internal combustion engine is started up. At the timing $t_1$, the bed temperature of the upstream side $NO_X$ selective reduction catalyst 14 and the bed temperature of the downstream side $NO_X$ selective reduction catalyst 15 are substantially the same as the temperature of the outside atmosphere. By starting up the internal combustion engine, the temperature of the exhaust gas rises. At the timing $t_2$, the upstream side $NO_X$ selective reduction catalyst 14 reaches the activation temperature.

At the timing $t_2$, the system detects that the upstream side $NO_X$ selective reduction catalyst 14 becomes the activation temperature or more and starts the feed of aqueous urea solution from the aqueous urea solution feed valve 55. In the exhaust purification system of the internal combustion engine in the present embodiment, the upstream side $NO_X$ selective reduction catalyst 14 is arranged at the downstream nearby region of the turbine 7b. It is possible to make the bed temperature the activation temperature or more in a short time after startup of the engine body 1. It is possible to start the removal of $NO_X$ in a short time and possible to suppress the discharge of $NO_X$.

In the period from the start of the internal combustion engine to when the upstream side $NO_X$ selective reduction catalyst reaches the activation temperature (period from timing $t_1$ to timing $t_2$), the $NO_X$ which is exhausted from the engine body 1 is adsorbed at the catalyst metal etc. included in the oxidation catalyst 13 or $NO_X$ selective reduction catalysts 14 and 15. Due to the adsorption of $NO_X$, it is possible to remove the $NO_X$ from the exhaust gas. The $NO_X$ adsorbed at the catalyst metal is gradually desorbed when the temperature rises and can be removed together with the $NO_X$ which is exhausted from the engine body 1.

Alternatively, referring to FIG. 2, the $NO_X$ selective reduction catalyst can reduce the $NO_X$ even in a temperature region lower than the activation temperature $T_X$. For this reason, it is also possible to start the feed of the aqueous urea solution when the temperature of the upstream side $NO_X$ selective reduction catalyst 14 reaches the temperature at which at least part of the $NO_X$ can be reduced.

In the present embodiment, the aqueous urea solution feed valve intermittently injects the aqueous urea solution. At the time of normal operation of the present embodiment, the amount of the aqueous urea solution which is fed from the aqueous urea solution feed valve can be made at least an amount enabling all of the $NO_X$ which flows into the upstream side $NO_X$ selective reduction catalyst 14 to be consumed.

Figure 4:
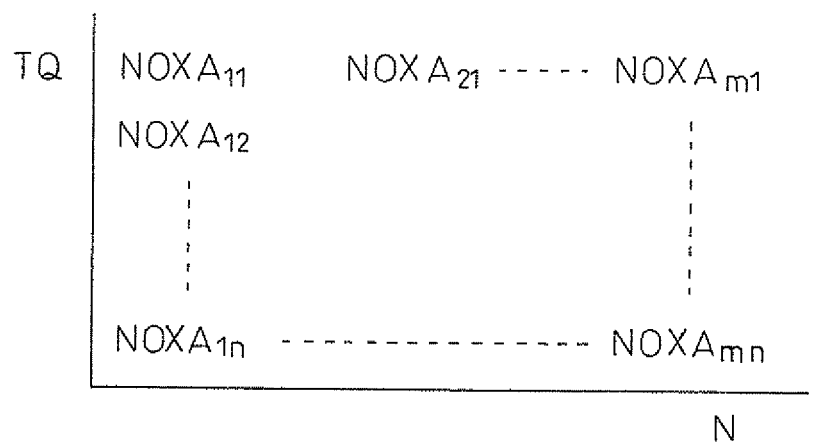
FIG. 4 is a map for calculating an amount of $NO_X$ which is exhausted from an engine body.

FIG. 4 shows a map of the amount of $NO_X$ which is exhausted from the engine body per unit time. For example, a map of the amount of $NO_X$ which is exhausted per unit time as a function of the engine speed N and demanded torque TQ is stored in advance in the ROM 32 of the electronic control unit 30. By cumulatively adding the $NO_X$ amount NOXA which is exhausted per unit time which is calculated in accordance with the operating state, it is possible to calculate the amount of $NO_X$ which flows into the upstream side $NO_X$ selective reduction catalyst 14 in a predetermined period. For example, it is possible to calculate the amount of $NO_X$ at intervals for injecting the aqueous urea solution from the aqueous urea solution feed valve. The calculated amount of $NO_X$ can be used as the basis for feeding the aqueous urea solution from the aqueous urea solution feed valve 55.

The estimation of the amount of $NO_X$ which flow into the upstream side $NO_X$ selective reduction catalyst 14 is not limited to the above. Any method may be used for estimation. The amount of $NO_X$ which flows into the upstream side $NO_X$ selective reduction catalyst 14 depends on the amount of $NO_X$ which is exhausted from the engine body. For this reason, the amount of the aqueous urea solution which is fed from the aqueous urea solution feed valve can be selected in accordance with the operating state of the engine body. For example, by changing the recirculation rate etc. of the exhaust gas, the amount of $NO_X$ which is exhausted from the engine body changes. In the case of an operating state where the amount of $NO_X$ which is exhausted from the engine body increases, control may be performed to increase the flow rate of feed from the aqueous urea solution feed valve.

In the present embodiment, a larger amount of aqueous urea solution is fed than the amount able to reduce all of the $NO_X$ which is exhausted from the engine body 1. That is, the aqueous urea solution is fed so that the equivalent ratio becomes larger than 1. At this time, the ammonia is in the excess state, so the ammonia flows out from the $NO_X$ selective reduction catalyst 14. Further, even if the equivalent ratio is 1, an uneven concentration arises inside of the $NO_X$ selective reduction catalyst 14. That is, locally the equivalent ratio exceeds 1. For this reason, ammonia flows out from the $NO_X$ selective reduction catalyst 14.

Referring to FIG. 3, the downstream side $NO_X$ selective reduction catalyst 15 reaches the activation temperature at the timing $t_3$. At the downstream side $NO_X$ selective reduction catalyst 15, it is possible to adsorb the inflowing ammonia in the period from the timing $t_1$ at the time of startup of the internal combustion engine to the timing $t_3$ where the temperature becomes the activation temperature $T_X$. Further, at the timing $t_3$ and on, it is possible to effectively adsorb ammonia and selectively reduce the $NO_X$ in the $NO_X$ selective reduction catalyst 15. In this way, it is possible to adsorb the inflowing ammonia or react the inflowing ammonia and $NO_X$ at the downstream side $NO_X$ selective reduction catalyst 15.

In the example of operational control shown in FIG. 3, if continuing the operation, the ammonia adsorption amount of the downstream side $NO_X$ selective reduction catalyst 15 gradually increases. At the timing $t_4$, the amount of ammonia adsorption of the downstream side $NO_X$ selective reduction catalyst 15 reaches a predetermined judgment value. For the upper limit side judgment value at the present embodiment, a value smaller than the allowable value of the ammonia adsorption amount of the $NO_X$ selective reduction catalyst 15 is employed. When the amount of ammonia adsorption of the downstream side $NO_X$ selective reduction catalyst 15 is the allowable value or more, the adsorption rate of the ammonia deteriorates and the amount of the ammonia which flows out from the $NO_X$ selective reduction catalyst 15 becomes greater. Alternatively, sometimes the ammonia which had been adsorbed at the $NO_X$ selective reduction catalyst 15 is desorbed. In the present embodiment, a judgment value which has an extra margin whereby even if an upper limit side judgment value is exceeded, the allowable value is not reached for a while is employed. This judgment value is, for example, stored in the ROM 32 of the electronic control unit 30.

Next, the amount of adsorption of the reducing agent is reduced so that the amount of adsorption of the reducing agent at the $NO_X$ selective reduction catalyst 15 does not exceed an allowable value. In the present embodiment, the amount of feed of reducing agent from the reducing agent feed device is adjusted. From the timing $t_4$, the amount of ammonia adsorption of the downstream side $NO_X$ selective reduction catalyst is reduced for adsorption amount reduction control. In the adsorption amount reduction control in the present embodiment, control is performed to make the amount of aqueous urea solution which is fed from the aqueous urea solution feed valve 55 decrease. The average amount of the aqueous urea solution per unit time which is fed to the upstream side $NO_X$ selective reduction catalyst 14 is reduced. In the present embodiment, the amount of aqueous urea solution which is injected per time is reduced without changing the interval for injection of the aqueous urea solution.

By making the amount of the aqueous urea solution which is fed to the $NO_X$ selective reduction catalyst 14 decrease, the reducing agent becomes insufficient. $NO_X$ which was not purified at the upstream side $NO_X$ selective reduction catalyst 14 flows out. The amount of $NO_X$ which flows out from the upstream side $NO_X$ selective reduction catalyst increases. The amount of $NO_X$ which slips through the upstream side $NO_X$ selective reduction catalyst increases. For this reason, the amount of $NO_X$ which flows into the downstream side $NO_X$ selective reduction catalyst 15 increases. At the downstream side $NO_X$ selective reduction catalyst 15, the adsorbed ammonia is used to reduce the $NO_X$. Along with the reduction of the $NO_X$, the amount of ammonia adsorption decreases.

The adsorption amount reduction control in the present embodiment continues until the ammonia adsorption amount reaches a predetermined lower limit side judgment value. At the timing $t_5$, the ammonia adsorption amount reaches the lower limit side judgment value. At the timing $t_5$, the adsorption amount reduction control is ended. At the timing $t_5$ and on, ordinary operational control is performed. That is, the feed amount of the aqueous urea solution from the aqueous urea solution feed valve 55 is restored to the amount at the time of ordinary operation.

In this way, in the present embodiment, the amount of ammonia adsorption at the downstream side $NO_X$ selective reduction catalyst 15 is estimated and the amount of ammonia adsorption is prevented from exceeding the allowable value by adjusting the feed amount of the aqueous urea solution from the aqueous urea solution feed valve 55. In particular, control is performed to reduce the amount of ammonia adsorption of the downstream side $NO_X$ selective reduction catalyst. Due to this configuration, it is possible to suppress the outflow of ammonia from the $NO_X$ selective reduction catalyst which is arranged at the downstream side. Alternatively, even if not detecting the adsorption amount of the reducing agent of the upstream side $NO_X$ selective reduction catalyst, it is possible to suppress the outflow of ammonia from the downstream side $NO_X$ selective reduction catalyst.

Further, the ammonia which flow out from the upstream side $NO_X$ selective reduction catalyst forms a substantially gaseous state, so the dispersibility in the exhaust gas is superior. That is, ammonia is substantially uniformly contained in the exhaust gas without the ammonia becoming locally denser or weaker. For this reason, when performing selective reduction at the downstream side $NO_X$ selective reduction catalyst, it is possible to increase the reactivity with $NO_X$. The slip through of the ammonia of the downstream side $NO_X$ selective reduction catalyst is suppressed and $NO_X$ can be reduced more reliably.

Further, the exhaust purification system of the present embodiment can trap and consume ammonia at the downstream side $NO_X$ selective reduction catalyst, so it is possible to feed excess aqueous urea solution to the upstream side $NO_X$ selective reduction catalyst. It is possible to feed the reducing agent so that the equivalent ratio becomes larger than 1. By feeding a larger amount of aqueous urea solution than the minimum amount enabling removal of all $NO_X$ which flows into the upstream side $NO_X$ selective reduction catalyst 14, it is possible to more reliably reduce the $NO_X$ at the upstream side $NO_X$ selective reduction catalyst 14.

In this way, the exhaust purification system of the internal combustion engine in the present embodiment can suppress the outflow of ammonia and can suppress the outflow of $NO_X$.

In the present embodiment, the upstream side $NO_X$ selective reduction catalyst and the downstream side $NO_X$ selective reduction catalyst are arranged at a predetermined distance. In the example which is shown in FIG. 1, the upstream side $NO_X$ selective reduction catalyst 14 is housed in the engine compartment which is arranged at the front of the automobile. The downstream side $NO_X$ selective reduction catalyst 15 is arranged below the floor panel. By arranging two $NO_X$ selective reduction catalysts separated from each other in this way, it is possible to provide a difference in bed temperature between the upstream side $NO_X$ selective reduction catalyst and the downstream side $NO_X$ selective reduction catalyst. It is therefore possible to separate the functions of the upstream side $NO_X$ selective reduction catalyst and the downstream side $NO_X$ selective reduction catalyst. For example, the temperature difference between the upstream side $NO_X$ selective reduction catalyst and the downstream side $NO_X$ selective reduction catalyst when engaged in steady state operation is preferably about 50° C. or more.

The downstream side $NO_X$ selective reduction catalyst 15 in the present embodiment can maintain a temperature lower than the temperature of the upstream side $NO_X$ selective reduction catalyst 14. For this reason, it is possible to maintain a state of a large adsorbable amount of ammonia. It is possible to make the ammonia which flows out from the upstream side $NO_X$ selective reduction catalyst 14 be adsorbed at the downstream side $NO_X$ selective reduction catalyst 15. As a result, it is possible to suppress the outflow of ammonia from the downstream side $NO_X$ selective reduction catalyst 15.

In the exhaust purification system of the present embodiment, the upstream side $NO_X$ selective reduction catalyst 14 and the downstream side $NO_X$ selective reduction catalyst 15 may be made using the same catalyst. That is, in the present embodiment, the same catalyst carrier and metal which is carried on the catalyst carrier are used, but the invention is not limited to this. The upstream side $NO_X$ selective reduction catalyst 14 and the downstream side $NO_X$ selective reduction catalyst 15 may also be made using different ones.

For example, the upstream side $NO_X$ selective reduction catalyst is closer to the engine body than the downstream side $NO_X$ selective reduction catalyst, so becomes higher in temperature than the downstream side $NO_X$ selective reduction catalyst. For this reason, the upstream side $NO_X$ selective reduction catalyst used preferably has a higher heat resistance temperature than the heat resistance temperature of the downstream side $NO_X$ selective reduction catalyst. Due to this configuration, it is possible to suppress the deterioration etc. of the $NO_X$ selective reduction catalyst. For example, it is preferable to employ a catalyst comprised of zeolite on which iron is carried by ion exchange for the upstream side $NO_X$ selective reduction catalyst 14 and to employ a catalyst comprised of zeolite on which copper is carried by ion exchange for the downstream side $NO_X$ selective reduction catalyst 15.

Further, in general, a high heat resistant metal catalyst has an activation temperature region present at the relatively high temperature side. For this reason, even when the upstream side $NO_X$ selective reduction catalyst becomes a high temperature, it is possible to maintain the activated state. On the other hand, in general, a low heat resistance catalyst has an activation temperature region present at the relatively low temperature side. The exhaust gas which is discharged from the engine body falls in temperature until reaching the downstream side $NO_X$ selective reduction catalyst. As shown in FIG. 3, a predetermined time is required to rise the temperature of a downstream side $NO_X$ selective reduction catalyst. However, by employing a catalyst with a low activation temperature region, the activation temperature can be reached in a short time even after startup. That is, when starting up the internal combustion engine, in addition to adsorption of ammonia, it is possible to selectively reduce the $NO_X$ after the elapse of a short time.

Further, the exhaust purification system is preferably formed so that the adsorbable amount of ammonia at the same temperature becomes larger at the downstream side $NO_X$ selective reduction catalyst 15 than at the upstream side $NO_X$ selective reduction catalyst 14. Due to this configuration, it is possible to adsorb the ammonia more reliably at the downstream side $NO_X$ selective reduction catalyst 15. It is possible to more reliably keep from the ammonia from flowing out from the downstream side $NO_X$ selective reduction catalyst 15.

In the above explanation, the amount of ammonia which is adsorbed at the downstream side $NO_X$ selective reduction catalyst is reduced for adsorption amount reduction control, but the invention is not limited to this. It is also possible to make the amount of ammonia adsorption of the downstream side $NO_X$ selective reduction catalyst increase for adsorption amount increase control. For example, when the amount of ammonia adsorption of the downstream side $NO_X$ selective reduction catalyst is small, adsorption amount increase control is performed. By increasing the amount of ammonia adsorption of the downstream side $NO_X$ selective reduction catalyst, it is possible to improve the $NO_X$ purification rate of the downstream side $NO_X$ selective reduction catalyst.

In the adsorption amount increase control, for example, it is detected that the amount of ammonia adsorption of the downstream side $NO_X$ selective reduction catalyst 15 is less than a predetermined judgment value. Next, the amount of the aqueous urea solution which is fed from the aqueous urea solution feed valve is made to increase. The amount of the aqueous urea solution at this time is preferably set so that the equivalent ratio with respect to the $NO_X$ which flows into the upstream side $NO_X$ selective reduction catalyst becomes larger than 1.

In the adsorption amount increase control, control may be performed to cause the amount of ammonia which is consumed or adsorbed at the upstream side $NO_X$ selective reduction catalyst 14 to decrease. For example, when intermittently feeding aqueous urea solution from the aqueous urea solution feed valve 55, control is performed to increase the amount of injection of aqueous urea solution per time and lengthen the interval of injection. By performing this control, even if the amount of injection of aqueous urea solution per unit time when averaged by time is the same, it is possible to increase the amount of ammonia which slips through the upstream side $NO_X$ selective reduction catalyst 14. It is therefore possible to increase the amount of ammonia adsorption of the downstream side $NO_X$ selective reduction catalyst.

Alternatively, when the spatial velocity (or flow rate of exhaust gas) is large, control is performed to make the feed amount of the aqueous urea solution increase. If the spatial velocity increases, the reaction time at the upstream side $NO_X$ selective reduction catalyst 14 becomes shorter. For this reason, it is possible to decrease the amount of ammonia which is consumed at the upstream side $NO_X$ selective reduction catalyst. Further, it is possible to reduce the amount of ammonia which is adsorbed at the upstream side $NO_X$ selective reduction catalyst. For example, when the spatial velocity (or flow rate of exhaust gas) is larger than a predetermined judgment value, control may be performed to make the feed amount of aqueous urea solution increase. As a result, it is possible to increase the amount of the ammonia which slips through the upstream side $NO_X$ selective reduction catalyst 14. It is possible to make the amount of ammonia adsorption of the downstream side $NO_X$ selective reduction catalyst increase.

In this regard, at the time of operation of the internal combustion engine, sometimes the temperature of the exhaust gas becomes extremely high. When regenerating the particulate filter etc., for example, the temperature of the exhaust gas which flows into the particulate filter is made to rise to about 600° C. or more. Sometimes the temperature of the upstream side $NO_X$ selective reduction catalyst becomes higher and the $NO_X$ purification rate falls. Alternatively, at the upstream side $NO_X$ selective reduction catalyst, when the temperature of the exhaust gas is high, sometimes the aqueous urea solution is oxidized and $NO_X$ is produced. In such a case, control may be performed to increase the amount of ammonia which slips through the upstream side $NO_X$ selective reduction catalyst. For example, it is possible to increase the amount of injection of aqueous urea solution per time and lengthen the injection interval or to feed a larger amount of aqueous urea solution when the spatial velocity is large. Due to this control, it is possible to decrease the amount of reaction of $NO_X$ at the upstream side $NO_X$ selective reduction catalyst and increase the amount of reduction of $NO_X$ at the downstream side $NO_X$ selective reduction catalyst.

Figure 5:
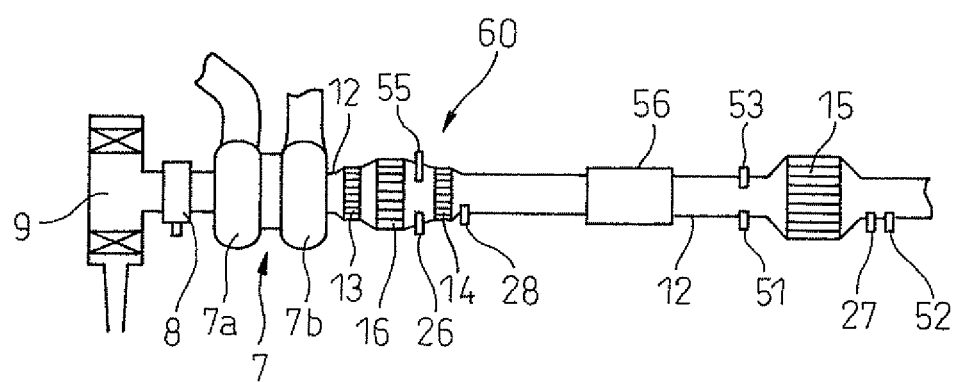
FIG. 5 is an enlarged schematic view of a part of an exhaust pipe of another exhaust purification system in the first embodiment.

FIG. 5 is a schematic view of another exhaust purification system of an internal combustion engine in the present embodiment. FIG. 5 is an enlarged schematic view of a part of an exhaust pipe of an internal combustion engine. In another exhaust purification system of an internal combustion engine, a temperature regulating device is provided for regulating the temperature of the downstream side $NO_X$ selective reduction catalyst 15.

The temperature regulating device in the present embodiment includes a cooling device 56 which lowers the temperature of the exhaust gas which flows into the $NO_X$ selective reduction catalyst 15. The cooling device 56 is arranged between the upstream side $NO_X$ selective reduction catalyst 14 and the downstream side $NO_X$ selective reduction catalyst 15. The cooling device 56 in the present embodiment is attached to the middle of the exhaust pipe 12 and is formed to cool the exhaust gas which flows through the inside of the exhaust pipe 12. In the example of FIG. 5, engine cooling water flows into the cooling device 56. The engine cooling water is used to cool the exhaust gas. The cooling device 56 is controlled by the electronic control unit 30.

By arranging a cooling device which cools the downstream side $NO_X$ selective reduction catalyst, it is possible to keep the downstream side $NO_X$ selective reduction catalyst from becoming high in temperature and the adsorbable amount of ammonia from becoming smaller. It is possible to maintain the temperature of the $NO_X$ selective reduction catalyst 15 within the temperature range where the ammonia adsorption amount is large. Alternatively, it is possible to avoid the $NO_X$ selective reduction catalyst 15 from becoming a temperature higher than the activation temperature region.

For example, control may be performed so that the temperature of the downstream side $NO_X$ selective reduction catalyst 15 is held at a predetermined judgment value or less. The temperature sensor 27 is used to detect the temperature of the downstream side $NO_X$ selective reduction catalyst 15. When the temperature becomes higher than the judgment value, the cooling device 56 cools the exhaust gas. By cooling the exhaust gas, it is possible to keep the temperature of the $NO_X$ selective reduction catalyst 15 from rising. Alternatively, it is possible to lower or maintain the temperature of the $NO_X$ selective reduction catalyst 15.

Further, in the present embodiment, the particulate filter 16 is arranged upstream of the downstream side $NO_X$ selective reduction catalyst 15. When regenerating the particulate filter 16, the temperature of the exhaust gas which flows into the $NO_X$ selective reduction catalyst 15 rises. When the temperature of the exhaust gas rises in this way, the cooling device 56 can be used to cool the exhaust gas.

The cooling device is not limited to this. It is also possible to employ any device which suppresses the rise in temperature of the $NO_X$ selective reduction catalyst. For example, the cooling device may also be arranged around the $NO_X$ selective reduction catalyst and formed so as to directly cool the $NO_X$ selective reduction catalyst.

Further, the temperature regulating device may also include a temperature elevating device which raises the temperature of the downstream side $NO_X$ selective reduction catalyst. Due to this configuration, the downstream side $NO_X$ selective reduction catalyst can be raised in temperature in a short time. For example, at the time of startup, it is possible to raise the temperature of the downstream side $NO_X$ selective reduction catalyst to the activation temperature or more in a short time and selectively reduce the $NO_X$.

Figure 6:
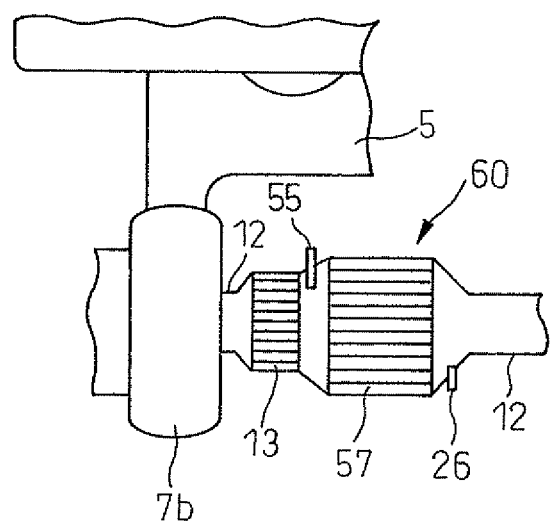
FIG. 6 is an enlarged schematic view of the nearby part of an exhaust turbocharger of still another exhaust purification system in the first embodiment.

FIG. 6 is a schematic view of still another exhaust purification system of an internal combustion engine in the present embodiment. FIG. 6 is an enlarged schematic view of the exhaust pipe at the nearby part of the turbine of the exhaust turbocharger. In still another exhaust purification system of an internal combustion engine, a catalytic converter 57 is arranged as the first $NO_X$ selective reduction catalyst. The catalytic converter 57 is comprised of the particulate filter and the $NO_X$ selective reduction catalyst joined together. The catalytic converter 57 carries a metal which promotes the selective reduction of $NO_X$ at the partition walls of the passages of the particulate filter.

At the upstream side of the catalytic converter 57, an aqueous urea solution feed valve 55 is arranged for feeding ammonia to the catalytic converter 57. Further, downstream of the catalytic converter 57, a temperature sensor 26 is arranged for detecting the temperature of the catalytic converter 57. By employing such a catalytic converter 57, it is possible to make the manifold converter 60 smaller in size.

In the present embodiment, when the amount of ammonia adsorption of the downstream side $NO_X$ selective reduction catalyst is the judgment value or more, control is performed to make the amount of ammonia adsorption decrease, but the invention is not limited to this. It is possible to perform any control to prevent the amount of ammonia adsorption from exceeding an allowable value. For example, control may be performed to estimate the increase rate of the amount of ammonia adsorption of the downstream side $NO_X$ selective reduction catalyst and to make the amount of ammonia adsorption decrease when this increase rate is a predetermined judgment value or more.

In the present embodiment, the explanation was given with reference to the example of an $NO_X$ selective reduction catalyst using ammonia as a reducing agent, but the invention is not limited to this. The $NO_X$ selective reduction catalyst need only selectively reduce $NO_X$ by the fed reducing agent. As the reducing agent, it is possible to employ any reducing agent by which an $NO_X$ selective reduction catalyst can reduce $NO_X$. For example, as the reducing agent, fuel of the engine body may also be employed. In this case, for example, it is possible to use an $NO_X$ selective reduction catalyst comprised of a catalyst carrier of zeolite or aluminum oxide ($Al_2O_3$) etc. on which a catalyst metal of copper, iron, or another base metal or a precious metal of platinum, palladium, etc. is carried. Further, by arranging a fuel feed valve instead of an aqueous urea solution feed valve, it is possible to feed a reducing agent to the upstream side $NO_X$ selective reduction catalyst. By arranging an air-fuel ratio sensor instead of an ammonia sensor, it is possible to estimate the concentration of the reducing agent which flows into the downstream side $NO_X$ selective reduction catalyst.

Further, the internal combustion engine in the present embodiment is arranged at an automobile, but the invention is not limited to this. It is possible to apply the present invention to any internal combustion engine.

Second Embodiment

Figure 7:
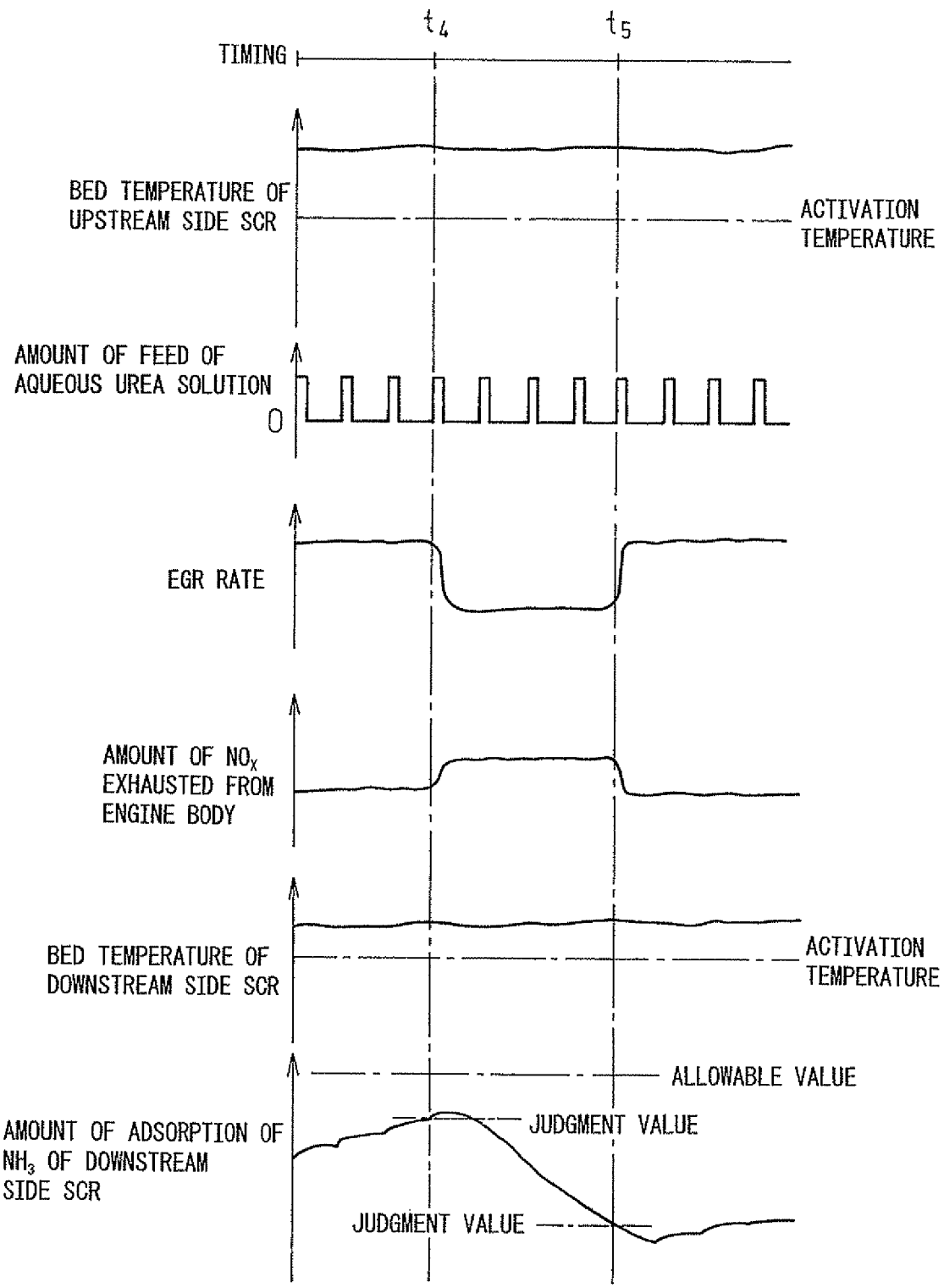
FIG. 7 is a time chart for explaining operational control in a second embodiment.
Figure 8:
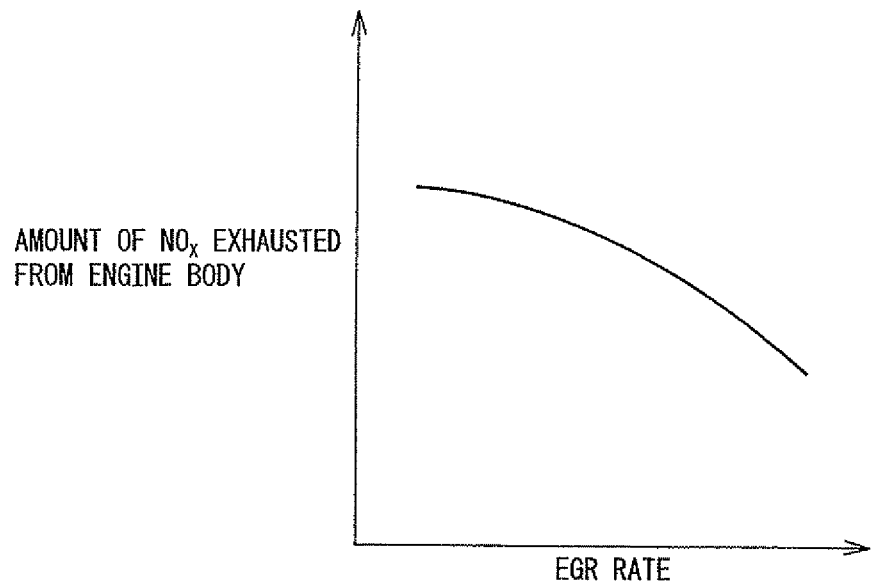
FIG. 8 is a graph showing an amount of an $NO_X$ which is exhausted from the engine body with respect to a recirculation rate in an exhaust purification system of an internal combustion engine.

Referring to FIG. 1, FIG. 7, and FIG. 8, an exhaust purification system of an internal combustion engine in a second embodiment will be explained. The exhaust purification system of the internal combustion engine in the present embodiment performs control to estimate the amount of adsorption of the reducing agent which is adsorbed at the second $NO_X$ selective reduction catalyst and prevent the estimated amount of adsorption of the reducing agent from exceeding the allowable value by decreasing the amount of adsorption of the reducing agent which is adsorbed at the second $NO_X$ selective reduction catalyst. In the present embodiment, as adsorption amount reduction control for making the amount of reducing agent which is adsorbed at the downstream side $NO_X$ selective reduction catalyst decrease, control is performed to make the amount of $NO_X$ which is exhausted from the engine body increase.

Referring to FIG. 1, in the present embodiment, the amount of $NO_X$ which is exhausted from the engine body 1 is made to increase so as to make the amount of $NO_X$ which slips through the upstream side $NO_X$ selective reduction catalyst 14 increase. The amount of $NO_X$ which flows into the downstream side $NO_X$ selective reduction catalyst 15 increases. By having the ammonia which is adsorbed at the $NO_X$ selective reduction catalyst 15 be used for reduction of the $NO_X$, the ammonia adsorption amount is decreased.

FIG. 7 shows a time chart of operational control of the internal combustion engine in the present embodiment. Up to the timing $t_4$, normal operation is performed while feeding the aqueous urea solution from the aqueous urea solution feed valve. At the timing $t_4$, the amount of ammonia which is adsorbed at the downstream side $NO_X$ selective reduction catalyst 15 reaches the upper limit side judgment value. In the period from the timing $t_4$ to the timing $t_5$, adsorption amount reduction control is performed. In the adsorption amount reduction control of the present embodiment, the recirculation rate (EGR rate) of the engine body 1 is made to decrease.

FIG. 8 is a graph showing the relationship between the recirculation rate of the engine body and the flow rate of nitrogen oxides which are exhausted from the engine body. The abscissa indicates the recirculation rate, while the ordinate indicates the flow rate of the nitrogen oxides which are exhausted from the engine body per unit time. The recirculation rate is the ratio of the flow rate of the recirculated exhaust gas with respect to the flow rate of all of the gas which flows into the combustion chamber (recirculation rate=(amount of recirculated exhaust gas)/(amount of recirculated exhaust gas+amount of intake air)). If the ratio of the exhaust gas increases, the recirculation rate increases. It is learned that if the recirculation rate becomes larger, the amount of $NO_X$ which is exhausted from the engine body is decreased.

Referring to FIG. 7, in normal operation, operation is performed while raising the recirculation rate so as to reduce the amount of $NO_X$ which is exhausted from the engine body. At the timing $t_4$, control is performed to make the recirculation rate decrease.

In the present embodiment, a feed amount similar to ordinary operation is maintained without changing the amount of feed of the aqueous urea solution from the aqueous urea solution feed valve. By reducing the recirculation rate of the engine body in adsorption amount reduction control, it is possible to make the amount of $NO_X$ which is exhausted from the combustion chamber increase. The amount of $NO_X$ which flows to the upstream side $NO_X$ selective reduction catalyst 14 is increased. The amount of $NO_X$ which flows out from the upstream side $NO_X$ selective reduction catalyst 14 is increased. As a result, the amount of $NO_X$ which flows into the downstream side $NO_X$ selective reduction catalyst 15 is increased. By the ammonia which is adsorbed at the downstream side $NO_X$ selective reduction catalyst 15 being consumed for reduction of the $NO_X$, the ammonia adsorption amount can be made to be decreased.

At the timing $t_5$, the amount of ammonia adsorption at the downstream side $NO_X$ selective reduction catalyst 15 reaches the lower limit side judgment value. At the timing $t_5$, the adsorption amount reduction control is ended. In the period from the timing $t_5$ on, normal operation is performed while returning the regeneration rate to its original rate.

In the adsorption amount reduction control of the present embodiment, the recirculation rate is made to decrease to thereby make the amount of $NO_X$ which is exhausted from the engine body 1 increase, but the invention is not limited to this. It is possible to make the amount of $NO_X$ which is exhausted from the engine body increase by any control. For example, it is possible to advance the injection timing of fuel in the combustion chamber to thereby make the amount of $NO_X$ which is exhausted from the engine body increase. That is, it is also possible to lengthen the ignition delay period until combustion so as to make the amount of $NO_X$ which is exhausted from the engine body increase.

Further, in the present embodiment, the amount of $NO_X$ which is exhausted from the engine body 1 is made to increase, but the invention is not limited to this. It is also possible to perform control to make the amount of $NO_X$ which is exhausted from the engine body 1 decrease. By making the amount of $NO_X$ which is exhausted from the engine body 1 decrease, the amount of $NO_X$ which flows into the downstream side $NO_X$ selective reduction catalyst 15 is decreased. As a result, it is possible to make the amount of ammonia which is adsorbed at the downstream side $NO_X$ selective reduction catalyst 15 increase for adsorption amount increase control.

Further, the upstream side $NO_X$ selective reduction catalyst employed preferably has a heat resistance temperature higher than the heat resistance temperature of the downstream side $NO_X$ selective reduction catalyst. Due to this configuration, it is possible to suppress deterioration of the $NO_X$ selective reduction catalyst etc.

The rest of the configuration, action, and effects are similar to the first embodiment, so explanations will not be repeated here.

Third Embodiment

Figure 9:
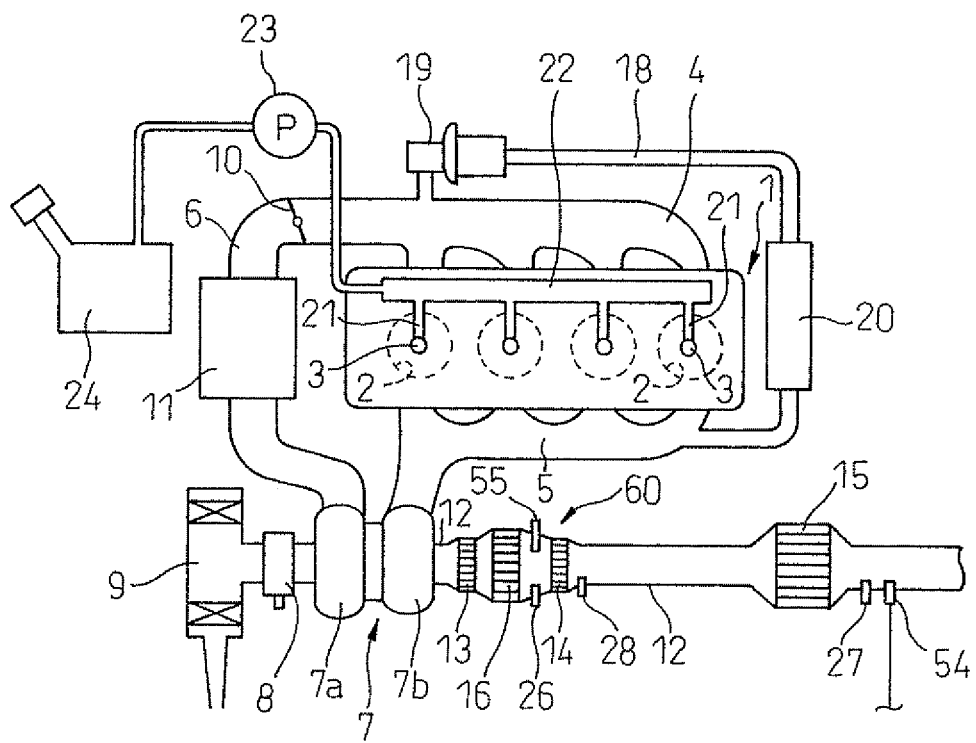
FIG. 9 is a schematic view of an internal combustion engine in a third embodiment.
Figure 10:
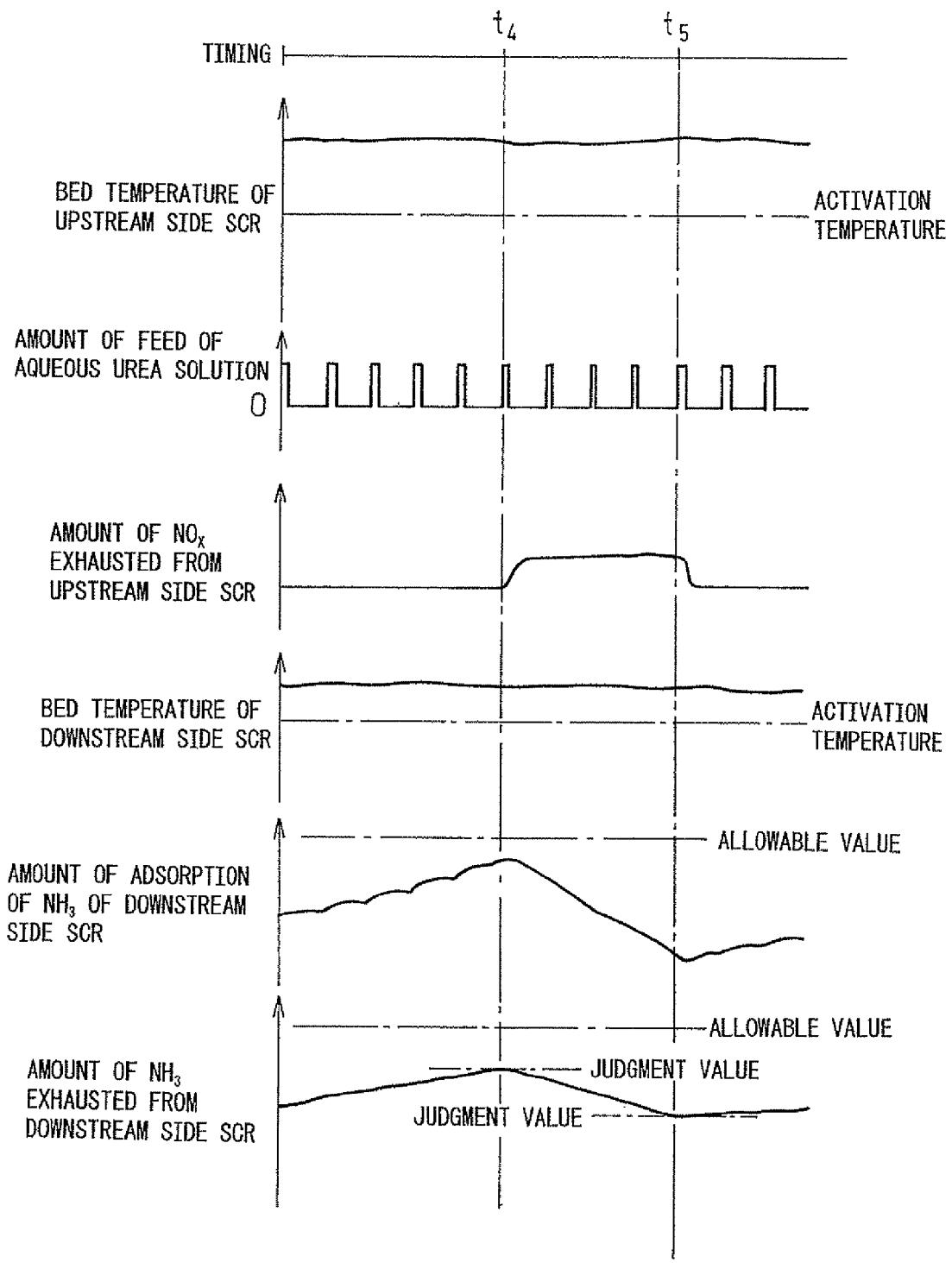
FIG. 10 is a time chart for explaining operational control in the third embodiment.

Referring to FIG. 1, FIG. 9, and FIG. 10, an exhaust purification system of an internal combustion engine in a third embodiment will be explained.

FIG. 9 is a schematic view of an internal combustion engine in the present embodiment. The internal combustion engine in the present embodiment is provided with a first $NO_X$ selective reduction catalyst comprised of the $NO_X$ selective reduction catalyst 14 and a second $NO_X$ selective reduction catalyst comprised of the $NO_X$ selective reduction catalyst 15. The ammonia sensor 4 is arranged at the engine exhaust passage downstream of the $NO_X$ selective reduction catalyst 15. The output signal of the ammonia sensor 54 is input through the corresponding AD converter 37 to the input port 35 (see FIG. 1).

The exhaust purification system of the internal combustion engine in the present embodiment is formed so as to be able to detect the concentration of ammonia which flows out from the downstream side $NO_X$ selective reduction catalyst 15. In the present embodiment, control is performed so that the concentration of ammonia which flows out from the downstream side $NO_X$ selective reduction catalyst 15 does not exceed an allowable value.

FIG. 10 shows a time chart of operational control of the internal combustion engine in the present embodiment. During operation, the ammonia sensor 4 is used to detect the concentration of ammonia which flows out from the downstream side $NO_X$ selective reduction catalyst. Until the timing $t_4$, ordinary operation is continued. From the timing $t_4$ to the timing $t_5$, adsorption amount reduction control is performed. From the timing $t_5$ on, normal operation is resumed.

During the normal operation up to the timing $t_4$, the amount of ammonia adsorption of the downstream side $NO_X$ selective reduction catalyst 15 approaches the allowable value. At this time, a fine amount of ammonia flows out from the downstream side $NO_X$ selective reduction catalyst 15. The amount of the ammonia which flows out gradually increases. The exhaust purification system in the present embodiment performs adsorption amount reduction control when the concentration of ammonia which flows out reaches a predetermined judgment value. The judgment value of this ammonia concentration is set smaller than the allowable value of the ammonia concentration. In the present embodiment, a judgment value has an extra margin so that even if an upper side judgment value is exceeded, the allowable value is not reached for a while. This judgment value is, for example, stored in the ROM 32 of the electronic control unit 30.

At the timing $t_4$, the concentration of ammonia which flows out from the downstream side $NO_X$ selective reduction catalyst 15 reaches a predetermined judgment value. In the adsorption amount reduction control in the present embodiment, in the same way as the adsorption amount reduction control in the first embodiment, control is performed to make the feed amount of aqueous urea solution from the aqueous urea solution feed valve decrease so as to make the amount of $NO_X$ which slips through the upstream side $NO_X$ selective reduction catalyst increase.

The exhaust purification system of the internal combustion engine in the present embodiment estimates the concentration of ammonia which flows out from the downstream side $NO_X$ selective reduction catalyst and prevents the concentration of ammonia from exceeding the allowable value by adjusting the amount of feed of reducing agent from the reducing agent feed device. Control is performed to make the amount of ammonia adsorption of the downstream side $NO_X$ selective reduction catalyst decrease. Due to this configuration, it is possible to suppress the outflow of ammonia from the downstream side $NO_X$ selective reduction catalyst.

Alternatively, it is possible to estimate the concentration of ammonia which flows out from the downstream side $NO_X$ selective reduction catalyst and, in the same way as the adsorption amount reduction control in the second embodiment, make the amount of $NO_X$ which is exhausted from the engine body 1 increase so as to make the amount of ammonia adsorption of the downstream side $NO_X$ selective reduction catalyst decrease.

In the present embodiment, when the amount of the ammonia which flow out from the downstream side $NO_X$ selective reduction catalyst becomes a judgment value or more, control is performed to make the ammonia adsorption amount decrease, but the invention is not limited to this. It is possible to perform any control so that the concentration of ammonia does not exceed an allowable value. For example, it is also possible to perform control to estimate the rate of increase of the concentration of ammonia which flows out from the downstream side $NO_X$ selective reduction catalyst and make the amount of ammonia adsorption decrease when this rate of increase becomes a judgment value or more.

Alternatively, it is also possible to estimate the concentration of ammonia which flows out from the downstream side $NO_X$ selective reduction catalyst and make the amount of ammonia adsorption of the downstream side $NO_X$ selective reduction catalyst increase for adsorption amount increase control. For example, it is also possible to perform adsorption amount increase control when the concentration of ammonia which flows out from the downstream side $NO_X$ selective reduction catalyst becomes less than the judgment value.

In the exhaust purification system of an internal combustion engine of the present embodiment, when employing a reducing agent comprised of the fuel of the engine body, for example, it is possible to arrange an air-fuel ratio sensor downstream of the downstream side $NO_X$ selective reduction catalyst so as to estimate the concentration of fuel which flows out from the downstream side $NO_X$ selective reduction catalyst.

Further, the upstream side $NO_X$ selective reduction catalyst employed is preferably one which has a heat resistance temperature higher than the heat resistance temperature of the downstream side $NO_X$ selective reduction catalyst. Due to this configuration, it is possible to suppress deterioration of the $NO_X$ selective reduction catalyst etc.

The rest of the configuration, action, and effects are similar to the first or second embodiment, so explanations will not be repeated here.

The above embodiments may be suitable combined. In the above figures, the same or corresponding parts are assigned the same notations. Note that, the above embodiments are illustrations and do not limit the invention. Further, in the embodiments, changes included in the claims are intended.

REFERENCE SIGNS LIST

1 . . . engine body
12 . . . exhaust pipe
13 . . . oxidation catalyst
14, 15 . . . $NO_X$ selective reduction catalyst
16 . . . particulate filter
18 . . . EGR passage
51, 52 . . . $NO_X$ sensor
53, 54 . . . ammonia sensor
55 . . . aqueous urea solution feed valve

The invention claimed is:

1. An exhaust purification system of an internal combustion engine comprising:
a first $NO_X$ selective reduction catalyst that is arranged inside of an engine exhaust passage and that selectively reduces $NO_X$ by feed of a reducing agent,
a second $NO_X$ selective reduction catalyst that is arranged inside of the engine exhaust passage at the downstream side of the first $NO_X$ selective reduction catalyst and that selectively reduces $NO_X$ by feed of a reducing agent,
a reducing agent feed device that feeds a reducing agent to the first $NO_X$ selective reduction catalyst, and
an electronic control unit having control logic configured to cause the electronic control unit to control the exhaust purification system, wherein
the reducing agent includes ammonia,
the second $NO_X$ selective reduction catalyst has an activation temperature region that is lower than an activation temperature region of the first $NO_X$ selective reduction catalyst,
the first $NO_X$ selective reduction catalyst and the second $NO_X$ selective reduction catalyst are configured so that a temperature difference between the first $NO_X$ selective reduction catalyst and the second $NO_X$ selective reduction catalyst arises that enables the ammonia that flows out from the first $NO_X$ selective reduction catalyst to be adsorbed at the second $NO_X$ selective reduction catalyst, and
the electronic control unit estimates the amount of adsorption of the reducing agent that is adsorbed at the second $NO_X$ selective reduction catalyst, without estimating the amount of adsorption of the reducing agent that is adsorbed at the first $NO_X$ selective reduction catalyst, and prevents the amount of adsorption of the reducing agent of the second $NO_X$ selective reduction catalyst from exceeding the allowable value by adjusting the amount of feed of reducing agent from the reducing agent feed device.

2. An exhaust purification system of an internal combustion engine as set forth in claim 1, wherein the electronic control unit decreases the amount of feed of reducing agent from the reducing agent feed device when the amount of adsorption of the reducing agent of the second $NO_X$ selective reduction catalyst becomes a predetermined judgment value of less than the allowable value or more.

3. An exhaust purification system of an internal combustion engine as set forth in claim 1, wherein the first $NO_X$ selective reduction catalyst has a heat resistance temperature which is higher than the heat resistance temperature of the second NOX selective reduction catalyst.

4. An exhaust purification system of an internal combustion engine comprising:
a first $NO_X$ selective reduction catalyst that is arranged inside of an engine exhaust passage and that selectively reduces $NO_X$ by feed of a reducing agent,
a second $NO_X$ selective reduction catalyst that is arranged inside of the engine exhaust passage at the downstream side of the first $NO_X$ selective reduction catalyst and that selectively reduces $NO_X$ by feed of a reducing agent,
a reducing agent feed device that feeds a reducing agent to the first $NO_X$ selective reduction catalyst, and
an electronic control unit having control logic configured to cause the electronic control unit to control the exhaust purification system, wherein
the reducing agent includes ammonia,
the second $NO_X$ selective reduction catalyst has an activation temperature region that is lower than an activation temperature region of the first $NO_X$ selective reduction catalyst,
the first $NO_X$ selective reduction catalyst and the second $NO_X$ selective reduction catalyst are configured so that a temperature difference between the first $NO_X$ selective reduction catalyst and the second $NO_X$ selective reduction catalyst arises that enables the ammonia which flows out from the first $NO_X$ selective reduction catalyst to be adsorbed at the second $NO_X$ selective reduction catalyst, and the electronic control unit estimates the amount of adsorption of the reducing agent that is adsorbed at the second $NO_X$ selective reduction catalyst, without estimating the amount of adsorption of the reducing agent that is adsorbed at the first $NO_X$ selective reduction catalyst, and makes the amount of $NO_X$ that is exhausted from the engine body increase when the amount of adsorption of the reducing agent of the second $NO_X$ selective reduction catalyst becomes a predetermined judgment value or more.

5. An exhaust purification system of an internal combustion engine as set forth in claim 4, wherein the first $NO_X$ selective reduction catalyst has a heat resistance temperature that is higher than a heat resistance temperature of the second $NO_X$ selective reduction catalyst.

6. An exhaust purification system of an internal combustion engine comprising:

a first $NO_X$ selective reduction catalyst that is arranged inside of an engine exhaust passage and that selectively reduces $NO_X$ by feed of a reducing agent, a second $NO_X$ selective reduction catalyst that is arranged inside of the engine exhaust passage at the downstream side of the first $NO_X$ selective reduction catalyst and that selectively reduces $NO_X$ by feed of a reducing agent, a reducing agent feed device that feeds a reducing agent to the first $NO_X$ selective reduction catalyst, and an electronic control unit having control logic configured to cause the electronic control unit to control the exhaust purification system, wherein the reducing agent includes ammonia, the second $NO_X$ selective reduction catalyst has an activation temperature region that is lower than an activation temperature region of the first $NO_X$ selective reduction catalyst, the first $NO_X$ selective reduction catalyst and the second $NO_X$ selective reduction catalyst are configured so that a temperature difference between the first $NO_X$ selective reduction catalyst and the second $NO_X$ selective reduction catalyst arises that enables the ammonia which flows out from the first $NO_X$ selective reduction catalyst to be adsorbed at the second $N_X$ selective reduction catalyst, and the electronic control unit estimates the concentration of the reducing agent that flows out from the second $NO_X$ selective reduction catalyst, without estimating the concentration of the reducing agent that flows out from the first $NO_X$ selective reduction catalyst, and prevents the concentration of the reducing agent that flows out from the second $NO_X$ selective reduction catalyst from exceeding the allowable value by adjusting the amount of feed of reducing agent from the reducing agent feed device.

7. An exhaust purification system of an internal combustion engine as set forth in claim 6, wherein the electronic control unit decreases the amount of feed of reducing agent from the reducing agent feed device when the concentration of the reducing agent which flows out from the second $NO_X$ selective reduction catalyst becomes a predetermined judgment value of less than the allowable value or more.

8. An exhaust purification system of an internal combustion engine as set forth in claim 6, wherein the first $NO_X$ selective reduction catalyst has a heat resistance temperature that is higher than a heat resistance temperature of the second $NO_X$ selective reduction catalyst.

9. An exhaust purification system of an internal combustion engine comprising:

a first $NO_X$ selective reduction catalyst that is arranged inside of an engine exhaust passage and that selectively reduces $NO_X$ by feed of a reducing agent, a second $NO_X$ selective reduction catalyst that is arranged inside of the engine exhaust passage at the downstream side of the first $NO_X$ selective reduction catalyst and that selectively reduces $NO_X$ by feed of a reducing agent, a reducing agent feed device that feeds a reducing agent to the first $NO_X$ selective reduction catalyst, and an electronic control unit having control logic configured to cause the electronic control unit to control the exhaust purification system, wherein the reducing agent includes ammonia, the second $NO_X$ selective reduction catalyst has an activation temperature region that is lower than an activation temperature region of the first $NO_X$ selective reduction catalyst, the first $NO_X$ selective reduction catalyst and the second $NO_X$ selective reduction catalyst are configured so that a temperature difference between the first $NO_X$ selective reduction catalyst and the second $NO_X$ selective reduction catalyst arises that enables the ammonia which flows out from the first $NO_X$ selective reduction catalyst to be adsorbed at the second $NO_X$ selective reduction catalyst, and the electronic control unit estimates the concentration of the reducing agent that flows out from the second $NO_X$ selective reduction catalyst, without estimating the concentration of the reducing agent that flows out from the first $NO_X$ selective reduction catalyst, and makes the amount of $NO_X$ that is exhausted from the engine body increase when the concentration of the reducing agent that flows out from the second $NO_X$ selective reduction catalyst becomes a predetermined judgment value or more.

10. An exhaust purification system of an internal combustion engine as set forth in claim 9, wherein the first $NO_X$ selective reduction catalyst has a heat resistance temperature that is higher than a heat resistance temperature of the second $NO_X$ selective reduction catalyst.

11. An exhaust purification system of an internal combustion engine as set forth in claim 1, wherein the second $NO_X$ selective reduction catalyst is arranged away from the first $NO_X$ selective reduction catalyst so that a temperature difference that enables ammonia which flows out from the first $NO_X$ selective reduction catalyst to be adsorbed at the second $NO_X$ selective reduction catalyst arises.

12. An exhaust purification system of an internal combustion engine as set forth in claim 1, wherein the exhaust purification system is provided with a cooling device that cools the second $NO_X$ selective reduction catalyst so that a temperature difference that enables ammonia which flows out from the first $NO_X$ selective reduction catalyst to be adsorbed at the second $NO_X$ selective reduction catalyst arises.

13. An exhaust purification system of an internal combustion engine as set forth in claim 1, wherein the exhaust purification system is arranged in an automobile that is provided with an engine compartment where the internal combustion engine is arranged and with a floor panel, and the first $NO_X$ selective reduction catalyst is arranged in the engine compartment and the second $NO_X$ selective reduction catalyst is arranged under the floor panel, so that a temperature difference that enables ammonia that flows out from the first $NO_X$ selective reduction catalyst to be adsorbed at the second $NO_X$ selective reduction catalyst arises.

* * * * *